(12) United States Patent
Watanabe et al.

(10) Patent No.: US 7,355,725 B2
(45) Date of Patent: Apr. 8, 2008

(54) MEASURING SYSTEM

(75) Inventors: Atsushi Watanabe, Tokyo (JP);
Kazunori Ban, Minamitsuru-gun (JP);
Ichiro Kanno, Minamitsuru-gun (JP)

(73) Assignee: Fanuc Ltd, Yamanashi (JP)

( * ) Notice: Subject to any disclaimer, the term of this patent is extended or adjusted under 35 U.S.C. 154(b) by 126 days.

(21) Appl. No.: 11/073,681

(22) Filed: Mar. 8, 2005

(65) Prior Publication Data
US 2005/0195409 A1    Sep. 8, 2005

(30) Foreign Application Priority Data
Mar. 8, 2004    (JP) ............................ 2004-064124

(51) Int. Cl.
*G01B 11/14* (2006.01)
(52) U.S. Cl. ..................... 356/614; 382/141
(58) Field of Classification Search .............. None
See application file for complete search history.

(56) References Cited

U.S. PATENT DOCUMENTS 5,150,422 A * 9/1992 Kitakado et al. ........... 382/149
5,780,866 A * 7/1998 Yamamura et al. ......... 356/609
6,101,268 A * 8/2000 Gilliland .................... 382/152
6,292,584 B1 * 9/2001 Dulaney et al. ............ 382/151

FOREIGN PATENT DOCUMENTS

JP    2001-160146    6/2001
JP    2003-34430    2/2003

* cited by examiner

*Primary Examiner*—Gregory J. Toatley, Jr.
*Assistant Examiner*—Juan D Valentin, II
(74) *Attorney, Agent, or Firm*—Drinker Biddle & Reath LLP

(57) ABSTRACT

A measuring system for easily detecting Misjudged Detection (M/D). A camera for measurement attached to a robot is used to obtain an image for measurement of a workpiece so as to measure and detect a set point. Next, a camera for validation is used to obtain an image for validation of the workpiece so as to measure and detect the set point. One camera may capture both of the images for measurement and validation, by utilizing movement of the robot. It is judged whether the measured results obtained from the images represent the same point on the workpiece or not. If yes, the measured results are judged to be valid, otherwise, the measured results are judged to be invalid and an exception process, such as a retrial, is executed. The images by the camera may also be used for judging a moving path of the robot during measurement of a large object.

3 Claims, 8 Drawing Sheets

MEASURING SYSTEM

BACKGROUND OF THE INVENTION

1. Field of the Invention

The present invention relates to a measuring system, combined with a robot in a production line, and suitable for detecting a positional drift of a workpiece to be worked by the robot such that the robot may compensate for the drift and carry out a predetermined process.

2. Description of the Related Art

One conventional process often required in a product line is a process in which a number of non-aligned workpieces are sequentially picked up and conveyed to a next process. In order to automate the process, various methods using a robot-sensor system having a robot combined with a vision sensor have been proposed. In general, the vision sensor has a sensor head for taking an image and an image processor for controlling the sensor head and for processing the image. The sensor head is provided with a camera or, in addition, a projector emitting a pattern of light such as a slit of light and a spot of light. Although the sensor head is usually attached near an end of the robot, the sensor head may be fixed near the robot for use.

As it is not easy to realize the above system in a reliable way, in the prior art, only a part of the system was put to a practical use by setting some conditions suitably. The experimental system has been improved to a practical level and application of the system has gradually expanded. For example, a system as described in Japanese Unexamined Patent Publication (Kokai) No. 2003-34430 has been used.

However, a detected result, from such a system, is often unreliable because of a difference between workpieces to be worked or the presence a confusing characteristic shape in one workpiece which is similar to a characteristic shape to be detected in the same workpiece and is positioned near the latter shape. In other words, "No Detection (N/D)" (in which the workpiece to be detected is not detected) and/or "Misjudged Detection (M/D)" (in which the confusing characteristic shape is misjudged as the characteristic shape to be detected) may occur which may result in stopping of the production line.

As one countermeasure against the above inconvenience, a method has been proposed, as described in Japanese Unexamined Patent Publication (Kokai) No. 2001-160146, in which an alarm is transmitted or a process is changed to another process when a quality (a contrast in this case) of an image deteriorates or becomes unclear, which seems to cause N/D and/or M/D. However, as No Detection and Misjudged Detection are not caused by only the deterioration of the image quality, it is difficult to eliminate all of N/D and M/D.

By the way, as N/D may be judged easier than M/D, the stopping of the production line may be avoided by preparing an exception process including a retrial command, in case of N/D. On the other hand, as M/D cannot be judged easily, it is difficult to determine whether the exception process is necessary or not. Therefore, there is a risk that the product line is stopped by a significant problem such as a crash caused by a malfunction of the robot due to M/D.

SUMMARY OF THE INVENTION

Accordingly, an object of the present invention is to provide a measuring system for preventing M/D having such as an adverse effect.

The present invention is to prevent occurrence of M/D by judging whether a measurement based on an image obtained by using a camera is correct or not. The validity of the measured result may be judged by checking a plurality of measured results obtained by a plurality of means such as a camera for measurement and a camera for validation, or, an image for measurement and an image for validation. The above two camera may be combined into one camera.

According to one aspect of the present invention, there is provided a measuring system for measuring a position of an object to be measured, the measuring system comprising: a camera for capturing the object from different points; an image processing part for calculating a plurality of measured results in relation to the position of the object based on a plurality of images captured by the camera; a comparing part for comparing the measured results with each other so as to determine whether the plurality of measured results represent the same position of the object or not; and a judging part for determining that the measured results are valid only when the plurality of measured results are determined to represent the same position of the object by the comparing part.

The measuring system may have one camera configured to be movable for capturing the object from two or more different points. Alternatively, the measuring system may have two or more cameras, the cameras being positioned at different points and being configured to capture the object from the different points.

According to another aspect of the present invention, there is provided a measuring system for measuring a position of an object to be measured, the measuring system comprising: a camera for obtaining an image for measurement and an image for validation of the object; a condition setting part for setting a condition of the image for validation to be satisfied; and a judging part for determining that measured results of the object are valid only when the image for validation satisfies the condition set by the condition setting part.

The measuring system may further comprise a transfer equipment for moving the camera to a plurality of points, the condition of the image for validation to be satisfied being that all of a plurality of images for validation include a part of the object.

The measuring system may have one camera configured to capture both of the images for measurement and validation. Alternatively, the measuring system may have a camera for capturing the image for measurement and another camera for capturing the image for validation.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 8A:
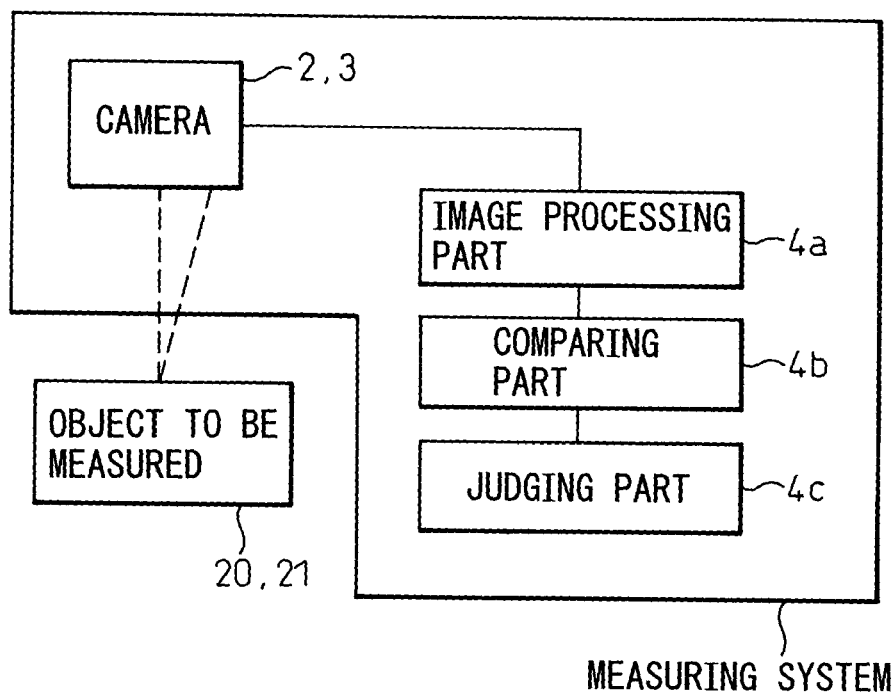
FIGS. 8a and 8b are block diagrams showing schematic configurations of a measuring system according to one aspect and another aspect of the invention, respectively.

FIG. 8a is a block diagram showing a schematic configuration of a measuring system according to the present invention. The measuring system for measuring a position of an object 20, 21 to be measured includes: a camera 2, 3 for capturing the object 20, 21 from different points; an image processing part 4a for calculating a plurality of measured results in relation to the position of the object 20, 21 based on a plurality of images captured by the camera 2, 3; a comparing part 4b for comparing the measured results with each other so as to determine whether the plurality of measured results represent the same position of the object 20, 21 or not; and a judging part 4c for determining that the measured results are valid only when the plurality of measured results are determined to represent the same position of the object 20, 21 by the comparing part 4b.

Figure 8B:
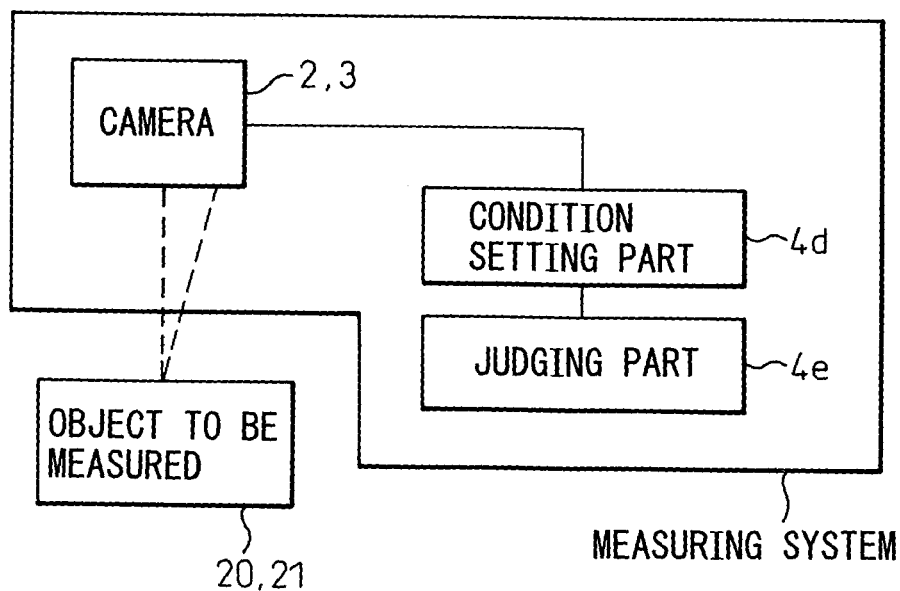

Also, FIG. 8b is a block diagram showing a schematic configuration of a measuring system according to another aspect of the present invention. The measuring system includes: a camera 2, 3 for obtaining an image for measurement and an image for validation of the object 200; a condition setting part 4d for setting a condition of the image for validation to be satisfied; and a judging part 4e for determining that measured results of the object 200 are valid only when the image for validation satisfies the condition set by the condition setting part 4d.

In a following embodiment, the image processing part 4a, the comparing part 4b, the judging parts 4c, 4e and the condition setting part 4d are included in a personal computer 4.

Figure 1:
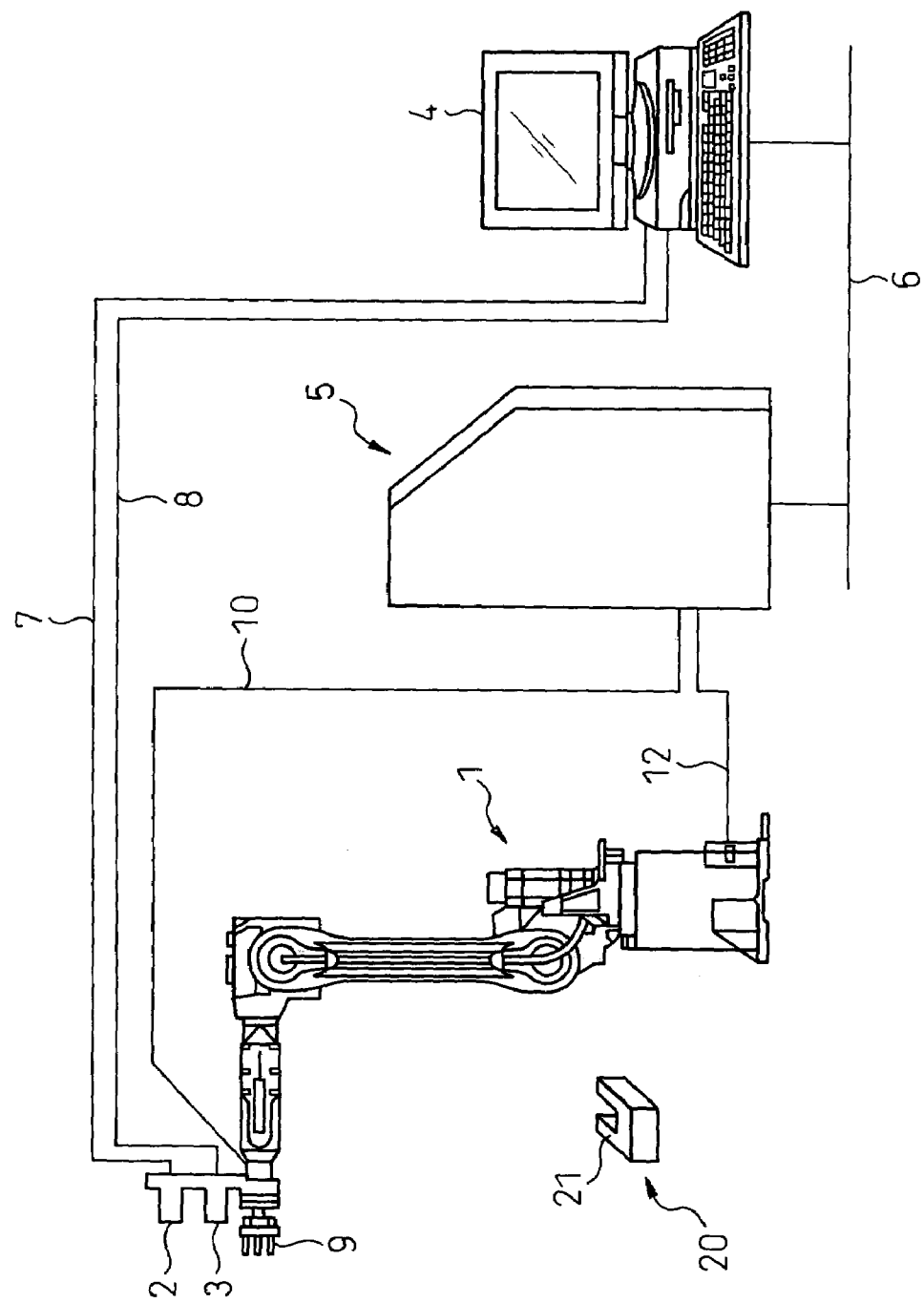
FIG. 1 is a general diagram showing a configuration of a measuring system according to one embodiment of the invention.

The embodiment of the invention will be described with reference to the drawings. First, FIG. 1 shows a total configuration of the embodiment of the invention. As shown, a numeral 1 denotes a robot controlled by a robot controller 5. The robot 1 and the robot controller 5 are connected each other by a cable 12. Two cameras 2, 3 and a robot hand 9 are attached to near an end of the robot 1. One of the two cameras 2, 3 is a camera for measurement and the other camera is a camera for validation. In the embodiment, the camera 2 may be the former and the camera 3 may be the latter, or vice versa. Further, as described below, only one camera 2 (or 3) may be used for both of measurement and validation. In this case, the robot 1 is used as a transfer equipment for the camera.

The cameras 2 and 3 are connected to a personal computer 4 via cables 7 and 8, respectively. The hand 9 is connected to the robot controller 5 via a cable 10. The personal computer 4 includes a control/image process part of the measuring system which controls an capturing motion of the cameras 2 and 3 as vision sensors of the measuring system and processes images obtained by the cameras 2 and 3 for detecting and measuring a set part (a characteristic shape) of an object to be measured.

In addition, it is assumed that calibration of the cameras 2 and 3 and combination of a robot coordinate system and a sensor coordinate system are already finished by known methods or techniques. Further, it is assumed that the sensor or the camera measures a two-dimensional position of a set part 21 corresponding to a part having characteristic shape of a workpiece 20 to be measured. Therefore, the set part is often referred as the characteristic part.

The robot controller 5 is connected to the personal computer 4 via a network line 6 such that the robot controller 5 may control the robot 1 and the hand 9 based on detected and measured results (or the position of the set part 21) by the personal computer 4. As the shown system is a two-dimensional measuring system, the position and orientation of visual lines of the cameras may be calculated. However, the system cannot get sufficient information or data for calculating the three-dimensional position of the set part. In order to compensate the lack of data, the height of the characteristic part 21 (or Z-coordinate value on the robot coordinate system Σb) may be used, if the height is known. Of course, if the measuring system is a three-dimensional measuring system (for example, having a sensor head including a light emitting part for emitting a slit of light or a spot of light), the three-dimensional position may be measured. In addition, the orientation of the workpiece 20 may be measured by three-dimensional position data of a plurality of characteristic parts of the workpiece 20.

Figure 2:
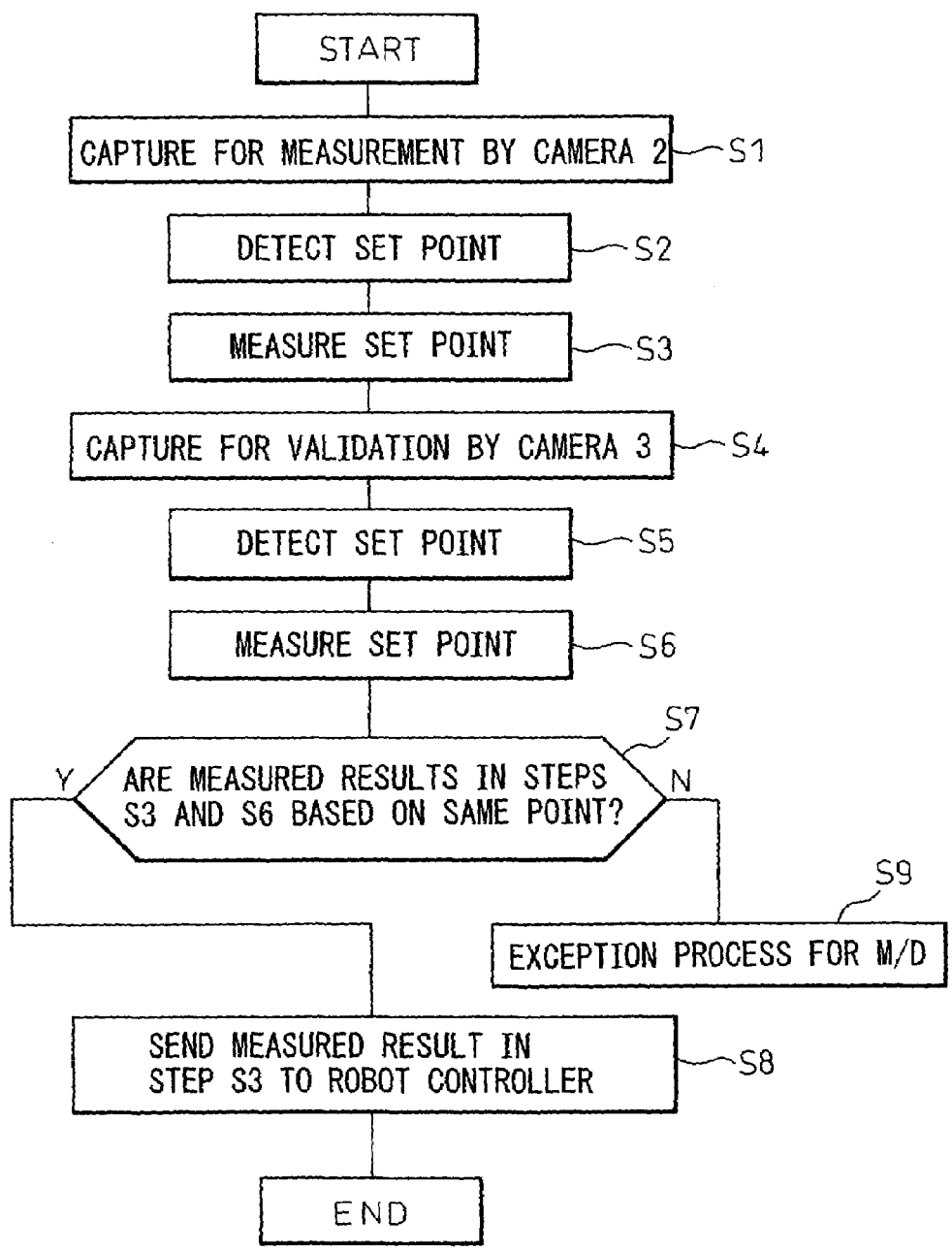
FIG. 2 is a flowchart showing an example of a process executed in the embodiment of the invention.

FIG. 2 is a flowchart showing an example of a process executed in the embodiment having the constitution shown in FIG. 1. A main point of each step will be described. In addition, it is assumed that the robot 1 is positioned at an initial position where the whole of the workpiece 20 is included in visual fields of the cameras 2 and 3.

Step S1

The camera 2 captures the workpiece 20 for obtaining an image for measurement.

Step S2

The image for measurement is processed to detect the set part 21 of the workpiece 20. In this point, another part which is different to the set part may be misjudged as the set part 21 (i.e., M/D occurs), as described below. As described above, the set part 21 of the workpiece may be a characteristic part such as a hole, a protrusion or a ridge of an outline of the workpiece. In order to detect the characteristic part, a known pattern matching technique may be used in which a reference image representing the characteristic part is used as a template. When the measuring system is a three-dimensional measuring system having a light emitting device for emitting a slit of light, the set part 21 may be detected by extracting an image of the characteristic part 21 from an image of emission lines formed on the workpiece 20 by the slit of light.

Step S3

The position of the set part 21 detected in step S2 is measured. As described above, the two-dimensional system cannot determine the three-dimensional position but can determine the position and orientation of the visual line of each of the cameras. In this embodiment, therefore, the position and orientation of a visual line 23 extending from a representative point (a center of a lens) of the camera 2 to a representative point 21a of the set part 21 is calculated.

Figure 3:
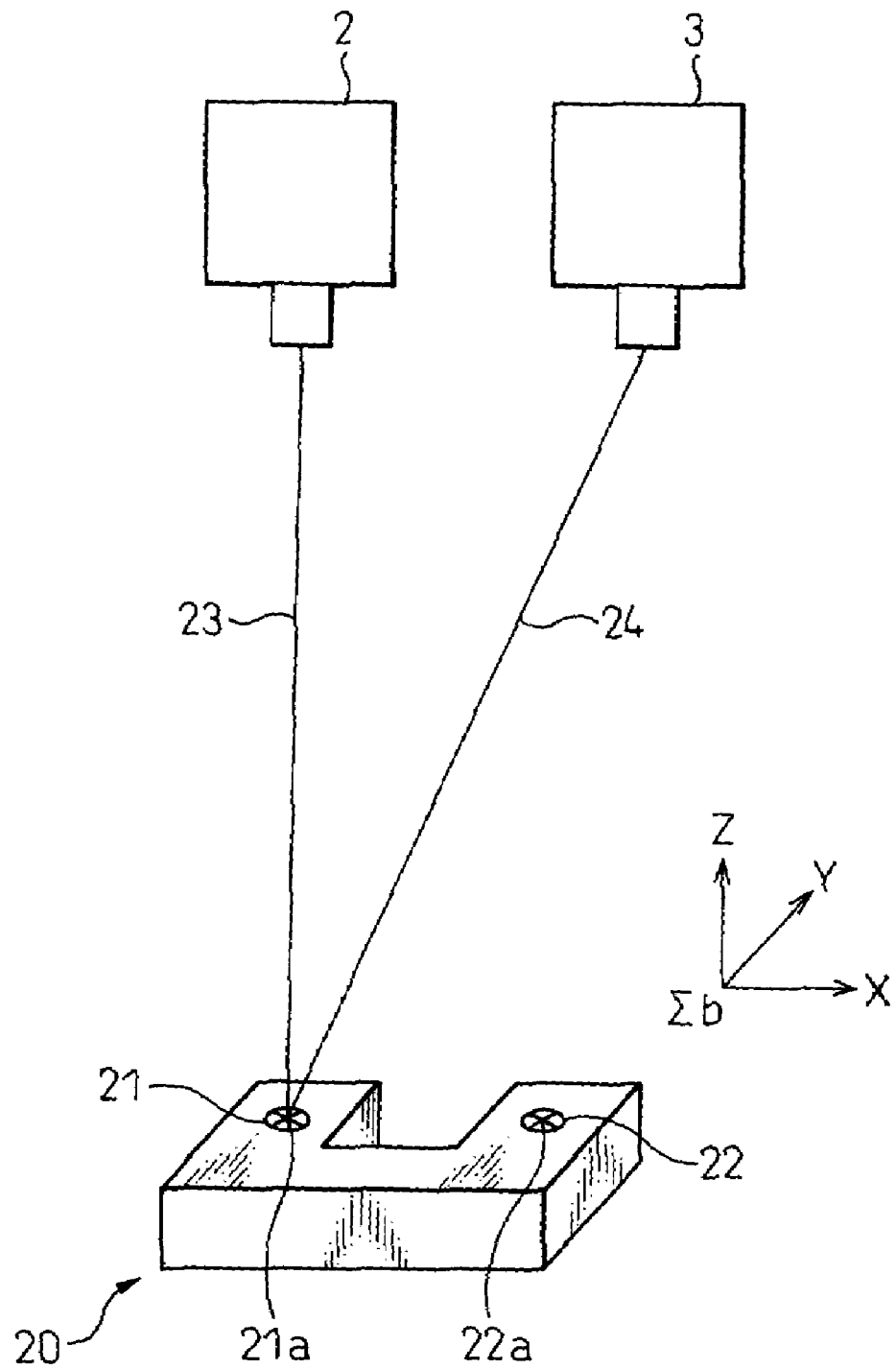
FIG. 3 is a diagram explaining a case in which cameras for measurement and validation exactly detect the same point as a set part when the measurement system is a two-dimensional measurement system.
Figure 4:
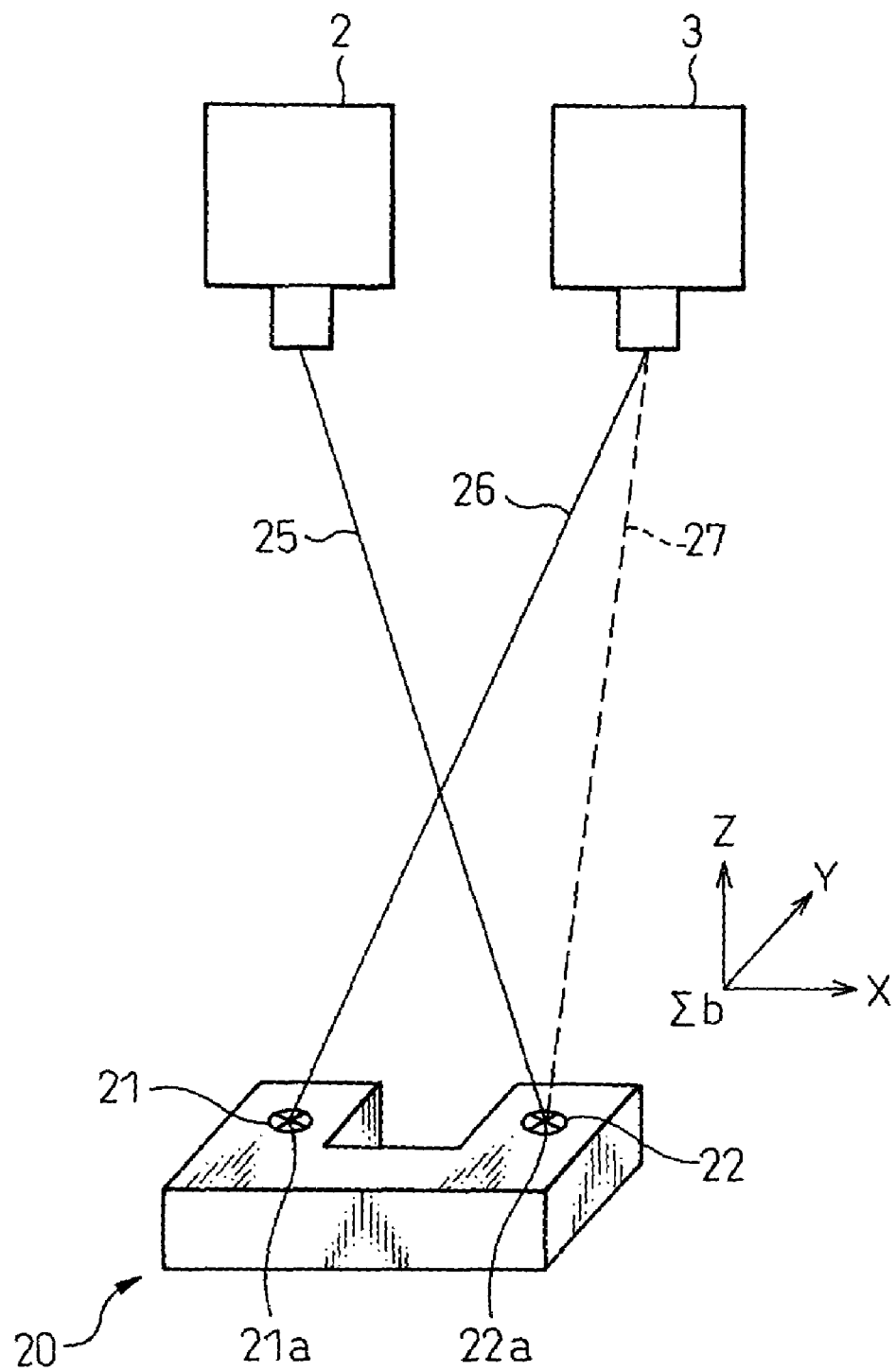
FIG. 4 is a diagram explaining a case in which the camera for measurement detects as M/D, in relation to FIG. 3.

However, if the detection of the set part 21 is "M/D", an incorrect visual line toward another point, not the set part 21, will be calculated, as shown in FIG. 4. In FIGS. 3 and 4, the set part or the characteristic part 21 is illustrated as a circular hole and the representative point 21a is a center of the hole. In this case, M/D may occur when another circular hole or a characteristic part 22 having a representative point 22a at the center of it is misjudged as the set part 21. When M/D occurs, as shown in FIG. 4, a visual line 25, not the visual line 23, is calculated. In addition, in the three-dimensional measuring system, the three-dimensional position of the representative point 21a of the characteristic part 21 will be calculated when M/D does not occur. Otherwise, the three-dimensional position of the representative point 22a of the characteristic part 22 will be calculated when M/D occurs.

Step S4

The camera 3 captures the workpiece 20 for obtaining an image for validation. The position of the robot 1 may be the same as when the camera 2 captures the workpiece. However, the robot 1 may be moved so as to make the difference between the images for measurement and validation clearer. When the camera 2 is used for capturing both of the images for measurement and validation, it is preferably that the robot 1 is moved after capturing the image for measurement and before capturing the image for validation so as not to coincide the image for validation to the image for measurement.

Step S5

The image for validation is processed to detect the set part 21 of the workpiece 20. In this point, M/D may also occur in which another part (for example, the characteristic part 22) is detected.

Step S6

The position of the set part 21 detected in step S5 is measured. In this embodiment, the position and orientation of a visual line 24 extending from a representative point (a center of a lens) of the camera 3 to a representative point 21a of the set part 21 is calculated, as shown in FIG. 3. However, if the detection of the set part 21 is "M/D", an incorrect visual line (for example, a visual line 27 shown in FIG. 4) toward another point will be calculated. In the three-dimensional measuring system, the three-dimensional position of the representative point 21a of the characteristic part 21 will be calculated when M/D does not occur. Otherwise, the three-dimensional position of the other representative point (for example, 22a) will be calculated when M/D occurs.

Step S7

In this step, measured results in steps S3 and S6 are compared to each other so as to judge whether the same point is detected and measured in the two steps. An algorithm for the judgment will be described below. When the same point is detected and measured in the two steps, the process is progressed to step S8, otherwise, to step S9. As far as the probability of occurrence of "M/D" is limited to some degree, it is very rare that both measured results in steps S3 and S6 are based on "M/D" (for example, the combination of the visual lines 25 and 27).

Step S8

The measured result in step S3 is stored as a correct measured result and is fed to the robot controller 5. The process is then finished. The robot controller 5 may utilize the measured result for controlling the robot 1 and the hand 9.

Step S9

When M/D occurs, an exception process is executed. The exception process may include various operations, such as a retrial after the position of the robot is changed.

Figure 5:
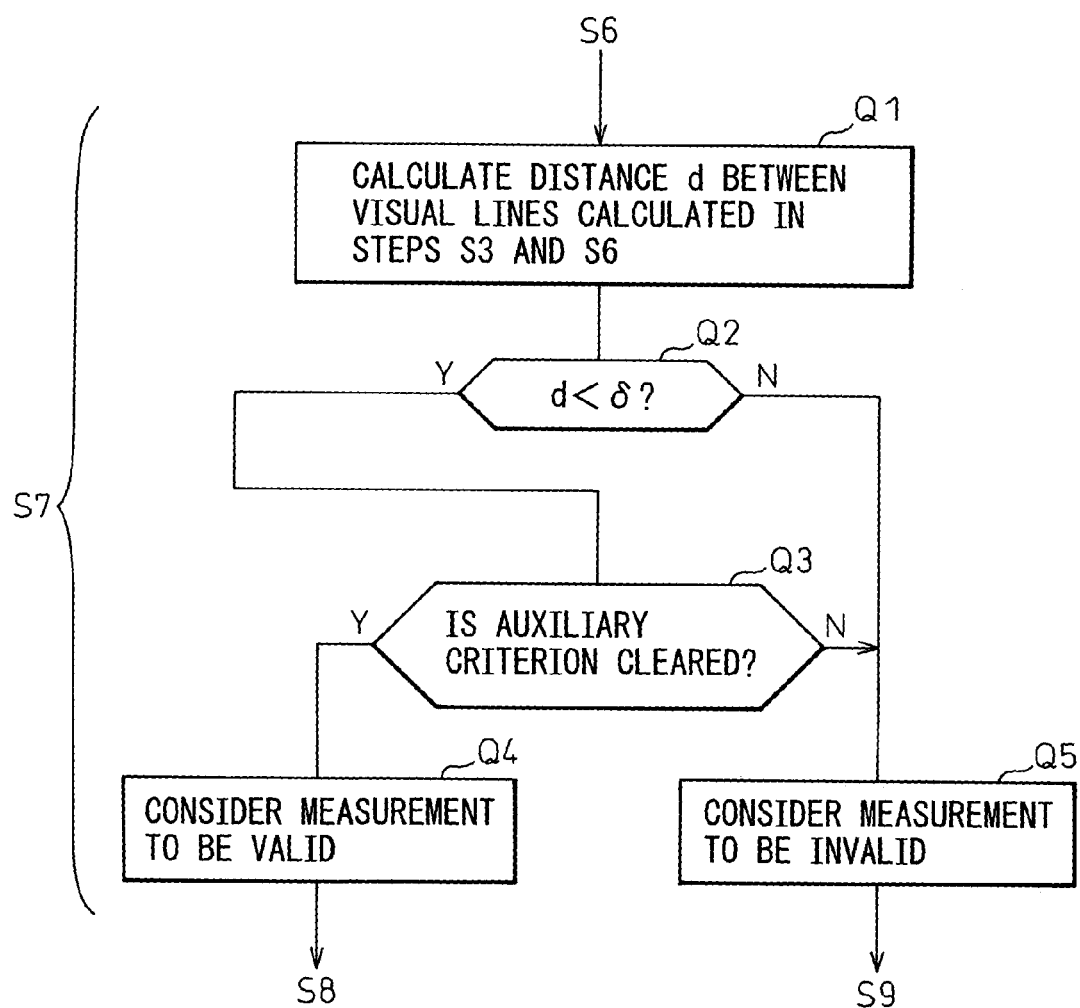
FIG. 5 is a flowchart showing a detail of step S7 in the flowchart of FIG. 2.

FIG. 5 shows one example of an algorithm for judging in step S7. A main point of each step of the algorithm will be described below.

Step Q1

The distance between the visual lines calculated in steps S3 and S6, i.e., the minimum distance d of the distances between arbitrary points of the visual lines calculated in steps S3 and S6, is calculated. When the visual lines intersect each other, the distance d is equal to zero. In addition, the coincidence of the two visual lines never occurs.

Step Q2

It is judged whether the distance d is smaller than a reference value $\delta$. As the reference value $\delta$, a value used for judging whether the two visual lines substantially intersect each other within a predetermined error range may be set previously.

When the distance d is equal to or larger than $\delta$ (d≧$\delta$), it is judged that the two visual lines do not substantially intersect each other. This result does not occur in the case of FIG. 3 in which M/D occurs neither in step S2 nor in step S5. Therefore, the result is determined as "M/D" and the process is progressed to step Q5 in which the measured result is considered to be invalid. Although it is possible that M/D occurs only in step S5 and not in step S2 (for example, the combination of the visual lines 23 and 27), this result is also considered to be invalid as the result is not reliable.

When the distance d is smaller than $\delta$ (d<$\delta$), the process is progressed to step Q3 for judging whether the intersection point of the visual lines corresponds to the set point 21a or not. This is because two visual lines (for example, lines 25, 26; 25, 27; and 23, 27) may intersect each other even if M/D occurs in at least one of steps S2 and S4. As the visual lines 23 and 24 may not intersect each other exactly at the point 21a due to the detection error even if both of the two lines detect the same point 21a, the actual distance d, which ideally should be equal to zero, may be stored and used as an index value of the detection error. It is preferable that the reference value $\delta$ is determined at a value which is sufficiently large for discriminating the detection error from "M/D". For example, when the maximum detection error is estimated to be about 1 mm, the reference value $\delta$ is preferably set to a some larger value such as 2 mm.

Step Q3

It is judged whether the intersection point of the visual lines corresponds to the set point 21a, by using a predetermined auxiliary criterion. As the auxiliary criterion, a range of coordinate values (height values) including a Z-coordinate value (on the robot coordinate system $\Sigma$b) of the point 21a may be used, for example. When the intersection point is within the range of coordinate values, it is judged that the intersection point corresponds to the set point 21a. The process is then progressed to step Q4. Otherwise, it is judged that the intersection point does not correspond to the set point 21a and, the process is then progressed to step Q5. In this regard, if the point 22a is misjudged as the set point in both steps S2 and S5, the process cannot be suitably treated in this step Q3. However, this is a rare case, as described above.

Step Q4

It is judged that the measured result is correct (M/D does not occur and the measurement is valid). The process is then progressed to step S8.

Step Q5

It is judged that the measured result is not reliable (M/D occurs and the measurement is invalid). The process is then progressed to step S9.

When the three-dimensional measuring system is used, the measured results in steps S3 and S6 are given as three-dimensional positions. Therefore, the measured results are judged as "M/D" or "invalid" when the three-dimensional positions do not coincide to each other (or the difference between them is larger than the detection error). On the other hand, when the three-dimensional positions coincide to each other (or the difference between them is equal to or smaller than the detection error), it is judged that the intersection point corresponds to the set point 21*a* based on an auxiliary criterion (a range of Z-coordinate values of the point 21*a*) similar to that in step Q3. If the intersection point corresponds to the set point, the measurement is considered to be "valid", otherwise, it is "invalid".

According to the above described process, it is possible to greatly reduce a frequency of a case in which a product line is stopped by a crash in the product line as a result of robot-control or hand-control based on the measurement data obtained by "M/D". The images for validation may be captured from a plurality points by increasing the number of the camera or by changing the position of the robot 1. In this case, M/D may be considered not to occur when it is determined that all of the measured result based on the image for measurement (step S3) and a plurality of measured results based on the plurality of images for validation represent are obtained by detecting the same point.

Figure 6:
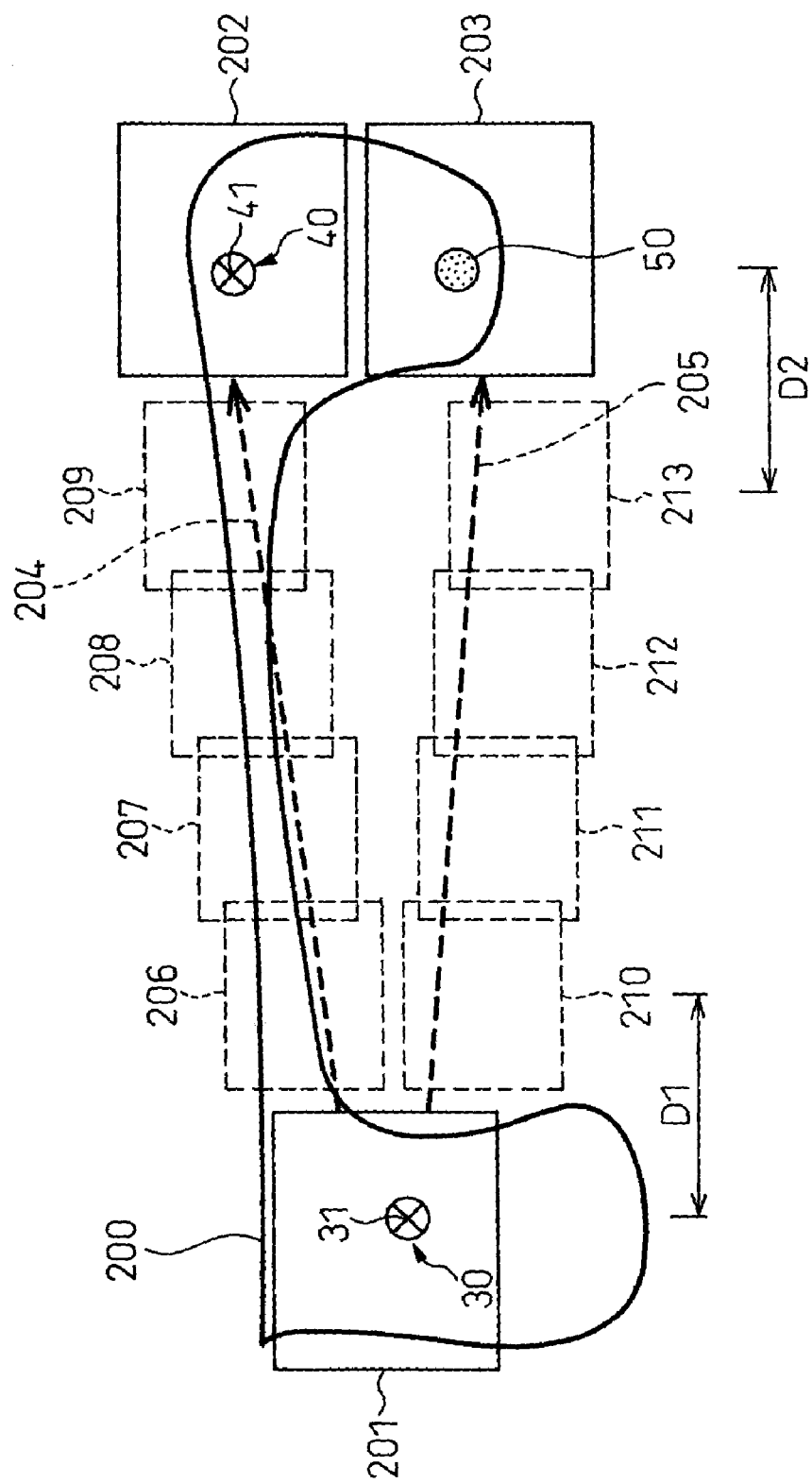
FIG. 6 is a diagram showing a large object to be measured.

As the size of the workpiece 20 is relatively small, in the above embodiment, it is not necessary to move the robot 1 even if a plurality of points of the workpiece 20 is required to be measured. However, in a large-sized workpiece such as an auto body component, it may be necessary to capture two points of the workpiece positioned away from each other such that a transfer equipment is required to move the robot 1 for capturing the two points by the camera, in order to ensure the measurement accuracy of the position and/or the orientation of the workpiece. FIG. 6 is a diagram for explaining an embodiment regarding such a case.

In FIG. 6, a large-sized workpiece 200 denoted by a numeral 200 has a characteristic part or a first set point 30 represented by a representative point 31 and a characteristic part or a second set point 40 represented by a representative point 41 to be measured. Further, as shown, a characteristic part 50 similar to the characteristic part 40, not to be measured, is positioned near the characteristic part 40. In this case, the workpiece 200 is roughly clamped at the side of the characteristic part 30 and the other side of the characteristic part 40 may be movable to some extent.

When the robot 1 is positioned at a predetermined or a constant position, the image of the characteristic part 30 may be surely captured in a visual field 201 of the camera for measurement 2 even though the side of the characteristic part 30 of the workpiece has a little positional error. However, as the side of the characteristic part 40 of the workpiece may relatively freely move, the image of the characteristic part 40 may be out of a visual field 202 of the camera 2 and the characteristic part 50 not to be measured may be captured in the visual field instead. The visual field including the characteristic part 50 is denoted by a numeral 203.

For the convenience of illustration, the workpiece 200 is fixed at the position and the orientation as shown and the path of movement of the robot is expressed by the movement of the visual field of the camera. When the characteristic part 50 is captured in the visual field instead of the characteristic part 40, the actual path of movement of the robot may change between paths denoted by numerals 204 and 205, even if the robot is taught the same path. When the actual path of movement is the path 204, "M/D" hardly occurs because the image of the characteristic part 40 is captured in the visual field 202. On the other side, when the actual path of movement is the path 205, "M/D" probably occurs because the image of the characteristic part 50 not to be measured is captured in the visual field 203.

By successively verifying the relative position of the robot 1 (or the cameras 2 and 3) to the workpiece 200 using the camera for validation 3 during the movement of the robot, it is possible to judge whether the path of movement is along the path 204 for obtaining the correct visual field 202. Numerals 206-209 in FIG. 6 represent visual fields obtained by the camera for validation 3 during the movement along the path 204. On the other hand, when the path of movement is the incorrect path 205, visual fields 210-213 are obtained by the camera for validation 3.

In such a case, the robot 1 may be considered to move along the correct path (relative to the workpiece 200) when a part of the workpiece 200 (in the embodiment of FIG. 6, two visible outlines of the workpiece) is continuously observed or captured by the camera for validation 3. As a result, the correct visual field 202 is obtained. Concretely, the robot 1 may be stably moved and positioned where the visual field 202 is obtained, by moving the robot 1 with a correction by which the part of the workpiece 200 to be observed is always positioned at the center of the visual field of the camera.

Figure 7:
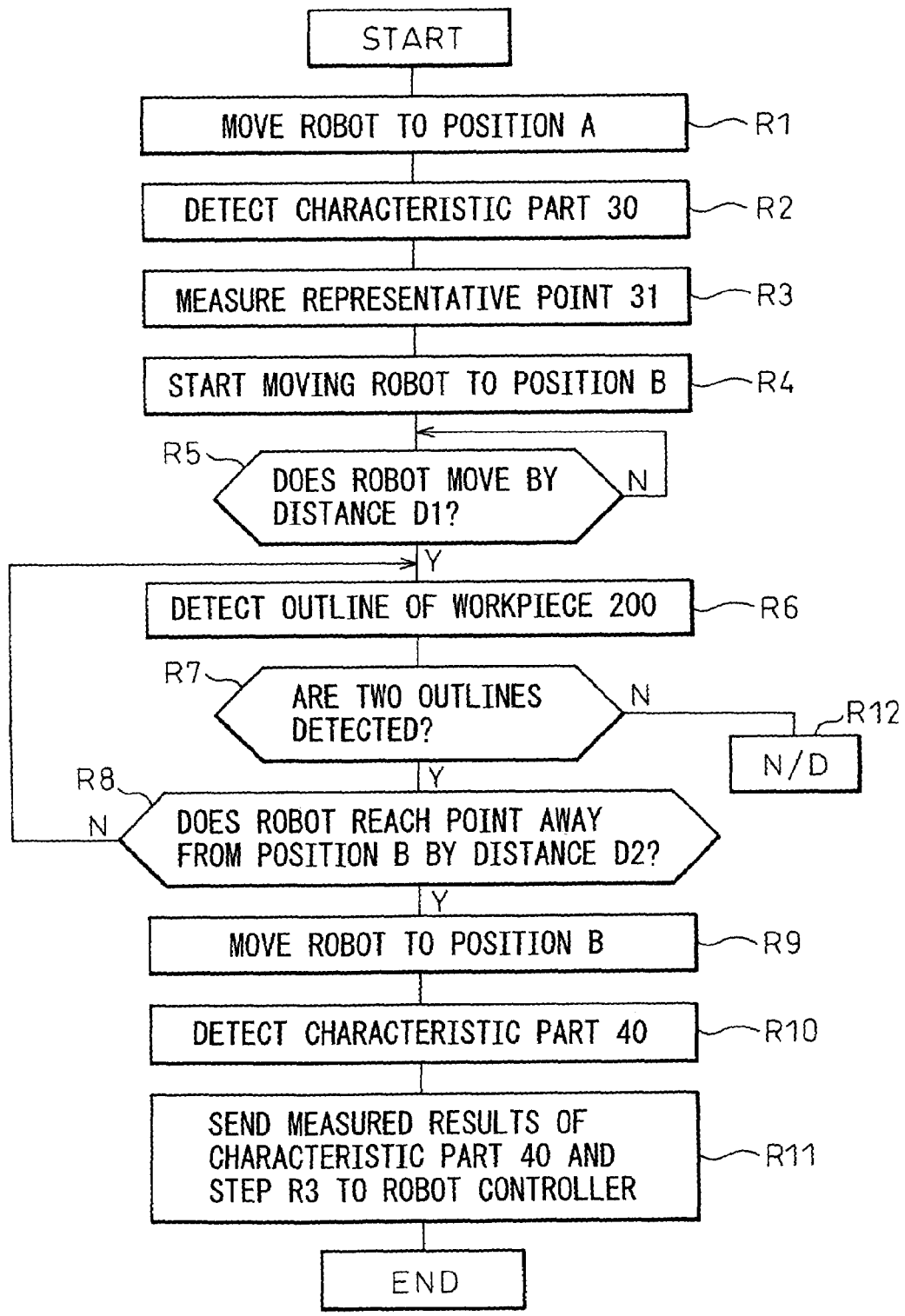
FIG. 7 is a flowchart showing an example of a process executed in an embodiment of the invention, in relation to FIG. 6.

FIG. 7 is a flowchart showing a process for determining that the measurement is valid or invalid, by checking the path of movement satisfies "a predetermined condition". The "predetermined condition" may be set in a condition setting part 4*d* such as the personal computer 4. In the embodiment, the "predetermined condition" may be "observing two visible outline of the workpiece 200" for representing the movement of the robot along the path 204. However, this condition is merely one example. The condition should be prepared in consideration of the relation between the shape of the workpiece and the path of the visual field. In the description below, the position of the robot where the visual field 201 is obtained is referred as "robot position A" and the position of the robot where the visual field 202 or 203 is obtained is referred as "robot position B". The key point of each step of the flowchart now will be described.

Step R1

The robot 1 is moved to the robot position A.

Step R2

The image including the characteristic part 30 is captured by the camera for measurement 2 for detecting the part. The pattern matching technique as described above may be used for the detection.

Step R3

The representative point 31 of the characteristic part 30 is measured. As described above, a visual line intersecting the representative point 31 may be obtained when the measuring system is a two-dimensional measuring system. When the measuring system is a three-dimensional measuring system, the three-dimensional position of the representative point 31 may be calculated.

Step R4

The robot starts to move toward the robot position B.

Step R5

It is checked whether the distance of movement of the robot from the position where capturing is carried out in step R2 is equal to or larger than the distance D1. The distance D1 is set to be a little larger than a minimum distance for checking whether the path is correct or not under the condition (or whether the two lines is observed or not).

Step R6

The image for validation is captured by the camera for validation 3 for detecting the visible outlines of the workpiece 200.

Step R7

It is checked whether the condition of the image (observing the two outlines in this case) is satisfied. If the condition is satisfied, the process is progressed to step R8, otherwise, to step R12.

Step R8

It is checked whether the robot reaches a position between the robot positions A and B, where it is away from the robot position B by the distance D2. The distance D2 is set to be a little larger than a minimum distance for checking whether the path is correct or not under the condition (or whether the two lines is observed or not). When the robot does not reach the position, the process is returned to step R6 to repeat the processes of steps R6 and R7. When the robot reaches the position, the process is progressed to step R9.

Step R9

The robot is moved to the robot position B.

Step R10

The characteristic part 40 (or the second set point) is captured for detecting the part.

Step R11

The representative point 41 of the characteristic part 40 is measured. This measured result and the result obtained in step R3 are stored as correct results and fed to the robot controller 5 to terminate the process. The robot controller 5 may use the measurement results for controlling the robot 1 and the hand 9.

Step R12

An exception process is executed in case of "N/D". When the process is progressed to step R12, it may be considered that the condition "observing the two outlines (continuously positioning the part of the workpiece 200 at the center of the visual field)" is not satisfied. Therefore, the fact that the condition is not satisfied may be considered as a proof that the path of the movement deviates from a predetermined path, i.e., "N/D". Then, an exception process for N/D is suitably executed.

According to the above process, the risk that the characteristic part 50 is misjudged as the characteristic part 40 (i.e.; "M/D") and the incorrect measurement result is obtained, is eliminated or reduced. In the above embodiment, the image for measurement in step R2 and the image for validation in step R6 are obtained by the camera for measurement 2 and the camera for validation 3, respectively. However, only the camera 2 may be used for both of measurement and validation. Also, the type of the measurement by the camera may be the two-dimensional or the three-dimensional, according to the shape and the size of the workpiece.

According to the present invention, M/D in a relatively small workpiece in which only one position of the workpiece should be measured may be avoided. In addition, M/D in a relatively large workpiece in which a plurality of the workpiece should be measured may be avoided.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A measuring system for measuring a position of an object to be measured, the measuring system comprising:
a camera for continuously capturing an image for measurement and an image for validation of the object;
a condition setting part for setting a condition of the image for validation to be satisfied; and
a judging part for determining that measured results of the object are valid only when the image for validation satisfies the condition set by the condition setting part; and
a transfer equipment for moving the camera to a plurality of points along a correct path relative to the object,
wherein the condition of the image for validation to be satisfied is that all of a plurality of images for validation captured by the camera at the plurality of points include a part of the object.

2. The measuring system as set forth in claim 1, wherein the measuring system has one camera configured to capture both of the images for measurement and validation.

3. The measuring system as set forth in claim 1, wherein the measuring system has a camera for capturing the image for measurement and another camera for capturing the image for validation.

* * * * *